Patented Mar. 30, 1954

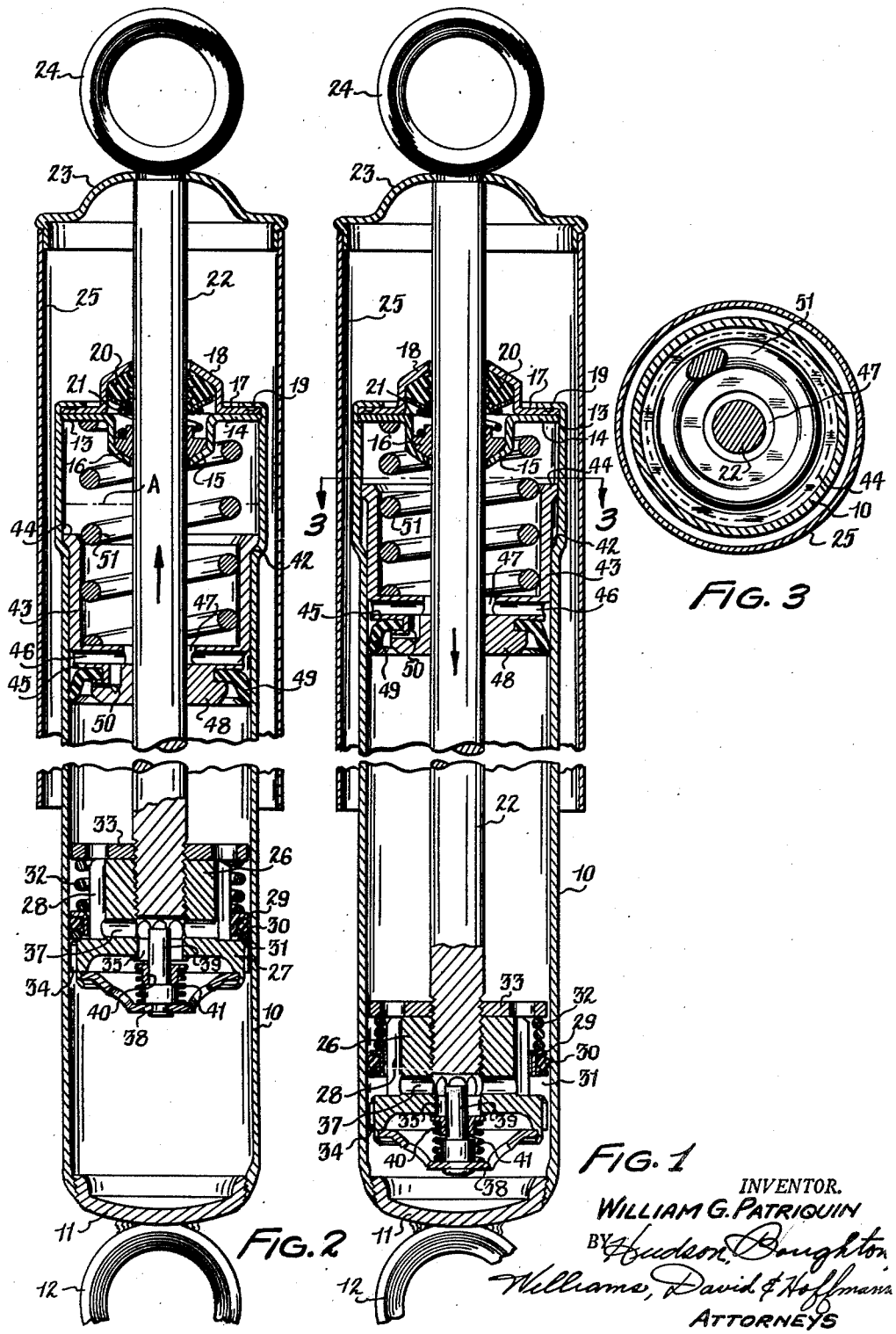

2,673,731

UNITED STATES PATENT OFFICE 2,673,731

SHOCK ABSORBER

William G. Patriquin, Cleveland, Ohio, assignor to The Gabriel Company, Cleveland, Ohio, a corporation of Ohio Application April 16, 1952, Serial No. 282,585

10 Claims. (Cl. 267—8)

1

This invention relates to a direct double acting hydraulic shock absorber.

An object of the invention is to provide a direct double acting hydraulic shock absorber which is of simple construction, requires a minimum amount of material, has improved operating characteristics and can be economically produced.

Another object is to provide a direct double acting hydraulic shock absorber which employs a single tube and does not require a reservoir tube concentrically surrounding the pressure cylinder tube and hence effects a substantial saving in material and cools more efficiently than does the usual direct double acting hydraulic shock absorber in that generated heat is dissipated directly from the single tube to atmosphere and does not have to pass from the working cylinder tube through the usual concentric reservoir and the concentric reservoir tube to reach atmosphere.

Another object is to provide a direct double acting shock absorber which employs a single tube that includes a reservoir portion at one end and is provided with improved and novel means for compensating for the volume of hydraulic medium displaced by the piston rod during the impact or downward stroke of the piston in the tube.

A further object is to provide a direct double acting hydraulic shock absorber wherein likelihood of hydraulic medium leaking therefrom is substantially eliminated in that the shock absorber comprises a single tube, one end of which is positively sealed while the end thereof through which the piston rod moves is effectively sealed by a low pressure seal since the hydraulic medium that might escape through such seal enters an expansion chamber before reaching the seal and hence the seal is not subject to high pressure hydraulic medium.

A further object is to provide a direct double acting hydraulic shock absorber capable of accomplishing the foregoing objects and comprising a single tube construction wherein the pressure chamber is of variable capacity and is closed at one end by a floating displacement head.

A still further object is to provide a direct double acting hydraulic shock absorber such as hereinbefore referred to and which is quieter in operation, in that it contains no moving impact and replenishing valves controlling communication between the pressure chamber and the reservoir.

Another object is to provide a direct double

2 acting hydraulic shock absorber formed with a single tube and wherein the preessure chamber and reservoir are in longitudinal alignment with each other yet the overall length of the shock absorber is such that it can be readily mounted in the spaces in which it would be used.

A still further object is to provide a direct double acting hydraulic shock absorber wherein different operating curve characteristics can be readily obtained by the simple measure of varying a spring calibration.

Further and additional objects and advantages not hereinbefore referred to will become apparent hereinafter during the detailed description of an embodiment of the invention which is to follow and which embodiment is illustrated in the accompanying drawing forming part of this specification and wherein, Fig. 1 is a longitudinal sectional view through a shock absorber embodying the invention and illustrates the relationship of the parts at substantially the end of the impact or compression stroke of the piston, i. e., the downward stroke thereof as viewed in the drawing.

Fig. 2 is a view similar to Fig. 1 but illustrates the relationship of the parts during the recoil or expansion stroke of the piston, i. e., the upward stroke thereof as viewed in the drawing, and Fig. 3 is a transverse sectional view taken substantially on line 3—3 of Fig. 1 looking in the direction of the arrows.

The shock absorber illustrated and embodying the invention comprises a single main tube 10. The lower end of the tube 10 as viewed in the drawing and as would be the case in the normal mounting of the shock absorber is closed by a closure 11 which interfits the lower end of the tube 10 and preferably is welded to the tube, thus providing a positive and complete closure at this end of the tube. The closure 11 has secured thereto a mounting eye 12. The upper end of the tube 10, as viewed in the drawings and as the tube would be normally positioned when the shock absorber is mounted, is provided internally with an annular shoulder 13 upon which seats the annular flange portion 14 of a cup-like support 15. The cup-like support 15 is located centrally and interiorly of the tube 10 and its bottom wall is inwardly tapered as illustrated and is provided with a central opening through which the piston rod, later to be referred to, extends. The cup-like support 15 mounts therein a bearing bushing 16 which interfits the inner portion of the cup-like support and is provided with a tubular extension adapted to project into a coil spring later to be referred to.

The annular flange 17 of a similar but inverted cup-shaped support 18 rests upon the annular flange 14 of the cup-shaped support 15 and is provided adjacent its periphery with an annular packing ring or gasket 19. The upper end of the tube 10 is spun over and radially inwardly on top of the gasket 19 and the flange 17 and locks the flanges 17 and 14 of the cup-shaped supports 15 and 18 firmly together and against the internal shoulder 13, thus providing a sturdy closure construction at this end of the tube. A piston rod packing gasket 20 is mounted in the cup-shaped support 18 while a coil spring 21 acts against the gasket 20 and against the bearing bushing 16 as illustrated and as will be well understood in the art.

The piston rod 22 extends through the central opening in the cup-shaped support 18 through the rod packing 20, through the coil spring 21 and bearing bushing 16 and opening in the cup-shaped support 15 into the tube 10. The outer or upper end of the rod 22 has rigidly secured thereto a cap 23 which centrally thereof and on its outer side mounts the upper attaching eye 24. The cap 23 has welded or otherwise suitably secured to its annular periphery a cylindrical guard 25 which reciprocates with the piston rod 22 and telescopes the tube 10 in spaced relation thereto.

The piston of the shock absorber is secured to the threaded end of the piston rod 22 within the tube 10. This piston is similar, although not quite identical, with the construction of the piston shown in my Patent 2,507,267, issued May 9, 1950.

The piston has a portion 26 of reduced diameter so that its circumference is spaced radially inwardly from the tube 10 and a larger portion 27 of a diameter such as to have substantially sliding fit in the tube 10. The reduced piston portion 26 is provided with a central threaded bore into which the threaded end of the piston rod is screwed. Also the reduced piston portion 26 on its circumference is provided with a plurality of circularly spaced longitudinally extending grooves 28, while a carrier ring 29 has sliding movement on the circumference of the reduced piston portion 26.

The carrier ring 29 mounts an O-ring packing and valve member 30 which bears against the radial flange of the carrier ring 29 and against a rigid ring 31, the purpose of which is fully explained in my said Patent 2,507,267. A coil spring 32 surrounds the reduced piston portion 26 and at one end abuts against an abutment plate 33 screwed onto the threaded end of the piston rod and at its other end abuts against the radial arm of the carrier ring 29.

It will be understood that said spring 32 functions to normally maintain the carrier ring 29, O-ring 30 and rigid ring 31 seated against the shoulder provided by the upper side of the larger piston portion 27 as indicated in Fig. 2 of the drawings.

The larger piston portion 27 is provided on its periphery with a series of circularly spaced longitudinally extending grooves or passages 34 which when the rigid ring 31, O-ring 30 and carrier 29 have moved to the position indicated in Fig. 1 place the interior of the tube 10 below the piston in communication with the interior thereof above the piston as will be readily understood.

The larger piston portion 27 is provided with a central bore 35 that communicates with a counterbore and also communicates with a plurality of radially extending ports or passages 37 formed in the reduced piston portion 26 and communicating in turn with the grooves 28 in the periphery of the reduced piston portion 26.

An abutment plate 38 is connected to the larger piston portion 27 and encloses the counterbore 36, said abutment plate 38 being held against a shoulder formed in the piston portion 27 by a spun over radially inwardly extending flange of the piston portion. The abutment plate 38 is provided with a plurality of relatively large circularly spaced openings and centrally it has rigidly secured thereto a pin 39 which has a reduced portion extending into the bore 35 with a substantial clearance therearound and slidably mounting a valve 40 which is normally held seated against the base of the counterbore 36 in sealing position with respect to the bore 35 by a coil spring 41.

The construction of the piston per se forms no part of the present invention and it will be understood that the valve 40 is the recoil piston valve which controls the flow of hydraulic medium through the piston during the recoil stroke of the piston, i. e., the upward stroke thereof, while the O-ring 30 in addition to being the packing ring for the piston is also the impact valve therefor which controls the flow of hydraulic medium past the piston during the impact stroke of the piston, i. e., the downward stroke.

The piston is provided with suitable bleed openings in conjunction with the valves just referred to but these need not be definitely identified or described as they are well known in the art since they are shown in my said Patent 2,507,267.

The tube 10, a predetermined distance below its upper end, is of reduced diameter as compared to the tube above such portion and thus an internal tapered shoulder 42 is provided in the tube 10 which, as stated, is spaced a predetermined distance from its upper end.

A floating displacement head is slidably mounted in the tube 10 and comprises on its upper end an upwardly facing cup-like portion 43, with the circumference of said portion 43 sliding on the interior of the reduced diameter portion of the tube 10. The cup-like portion 43 of the floating displacement head at its upper end is provided with an outwardly extending flange or bead 44 which engages the tapered internal shoulder 42 to limit movement of the displacement head in one direction.

The floating displacement head has a portion 45 which might be termed the bottom of the cup-shaped portion 43 and this portion 45 adjacent to the cup-shaped portion 43 is of slightly less diameter than the interior of the reduced diameter portion of the tube 10 and is provided with a plurality of circularly spaced radially extending passages 46 which terminate at their outer ends at the circumference of the portion 45 and at their inner ends in a central opening 47 of larger diameter than the external diameter of the piston rod 22.

Integral with the portion 45 of the floating displacement head is a mounting portion 48 having an external diameter substantially less than that of the portion 45 and provided with a central opening concentric with the opening 47 and slidably receiving the piston rod 22. The mounting portion 48 of the floating displacement head mounts an inverted cup-shaped packing washer 49, the annular lip of which contacts the interior of the reduced diameter portion of the tube 10. The space between the mounting portion 48 and the lip of the cup-shaped packing washer 49 may be vented by one or more air-vent passages 50 communicating with said space adjacent the base of the cup-shaped packing washer 49 and also communicating with certain of the radial passages 46 in the portion 45 of the floating displacement head.

A suitably calibrated coil spring 51 surrounds the piston rod 22 and has one end abutting the flange 14 of the cup-like support 15 and its other end extending into the cup-like portion 43 of the floating displacement head and abutting against the bottom portion 45 thereof. The spring 51 functions to maintain the floating displacement head normally in the position indicated in Fig. 2 of the drawing with the bead or flange 44 against the tapered internal shoulder 42. However, when the pressure within the tube 10 and below the floating displacement head reaches a point greater than that for which the spring 51 is calibrated then such pressure will move the floating displacement head upwardly in the tube, as for instance, to the position shown in Fig. 1.

It will be assumed that the shock absorber is operatively connected to two relatively movable members as, for instance, the axle of a motor vehicle and the spring suspended frame thereof. It will be understood that the shock absorber is thus connected by means of trunnion pins carried by the frame and axle and extending through the eyes 24 and 12 respectively of the shock absorber, wherefore the latter will be mounted with the eye 12 lowermost and the eye 24 uppermost.

It will be assumed that the tube 10 below the floating displacement head has been filled with hydraulic medium such as oil when the piston was nearest to the floating displacement head and that the oil also is within the tube 10 above the displacement head to the level indicated in Fig. 2 by dot and dash line A. In addition it will be assumed that the spring suspension of the frame is expanded and the piston is adjacent to the floating displacement head in the tube 10, that is it is in its upper position while the floating displacement head is in its lowermost position with the flange 44 contacting the internal shoulder 42.

Now assuming relative movement of the axle and frame of the vehicle toward each other to compress the spring suspension of the frame because of an impact transmitted to the axle, it will be evident that the piston and piston rod 22 will move downwardly in the tube 10 as indicated in Fig. 1 of the drawing. As the piston moves downwardly the volume which the entering piston rod 22 occupies within the tube below the floating displacement head continuously increases and thus continuously and relatively quickly displaces an increasing volume of oil that is between the piston and the floating displacement head. The oil thus displaced by the entering piston rod rapidly and substantially raises the pressure in the tube 10 between the piston and the floating displacement head, it being understood that this oil cannot escape in any substantial amount through the floating displacement head to the enlarged upper end of the tube, inasmuch as the pressure acting on the cup-shaped packing washer 49 tightly presses the same against the tube 10. As soon as the pressure built up by the rod displaced oil overcomes the load of the spring 51 the floating displacement head moves upwardly in the tube 10 as indicated in Fig. 1 to thus increase the capacity of the pressure chamber above the piston and compensate for the volume of the entering rod. Inasmuch as the oil above the floating displacement head is only to the level indicated by the dot and dash line A in Fig. 2, it will be seen that upward movement of the displacement head can occur with only a resultant compression of air in the space above the line A and the upper end of the tube 10. The displacement of the oil by the piston rod produces a shock absorbing action and the degree and character of this action can be determined by the calibration given to the spring 51, that is by determining the desired degree of shock absorbing action before the displacement head moves upwardly to increase the capacity of the pressure chamber.

It will be understood that as the piston moves downwardly in the tube 10 during its impact stroke the recoil valve 40 of the piston remains seated and that the O-ring impact valve 30 will be displaced upon a predetermined pressure as indicated in Fig. 1 to allow the oil below the piston to flow to the upper side thereof through the axially extending passages or grooves 34 and 28 on the circumferences of the piston portions. The resistance of the oil to piston movement also provides a shock absorbing action.

Now assuming that the spring suspension between the frame and axle expands after being compressed, then the piston and piston rod will move upwardly relative to the tube 10. During the course of this upward or recoil movement of the piston and piston rod less and less of the piston rod is in the pressure chamber between the piston and the floating displacement head and the pressure in this portion of the pressure chamber falls until the spring 51 moves the floating displacement head from the position shown in Fig. 1 to the position shown in Fig. 2, thus reducing the capacity of the pressure chamber between the piston and the displacement head. This occurs before the piston has completed its recoil stroke and hence the further movement of the piston in completing its recoil stroke lowers still farther the pressure in the chamber.

During the upward or recoil movement of the piston the impact O-ring valve 30 seats while the recoil valve 40 opens to allow oil to flow through the piston from the upper side thereof to the lower side to tend to fill the tube below the piston. The resistance of the oil to recoil piston movement affords a shock absorbing action. When the piston has reached substantially the end of its upward or recoil movement and just before commencing another downward or impact movement an injection of the oil in the space above the displacement head into the pressure chamber below the displacement head will occur through the passages 46 in the displacement head and past the lip of the cup-shaped packing 49 to restore to full capacity the oil in the pressure chamber. At such time the pneumatic pressure and the oil pressure in the reservoir combined will be greater than the pressure in the chamber, wherefore the injection of oil will be effected by such pressure differential.

It will be understood that if the space in the pressure chamber below the piston is not completely filled with oil and the latter part of the upward or recoil movement of the piston has tended to produce a vacuum in such space, then the injection of the oil from the reservoir above the displacement head as just referred to will operate to completely fill the pressure chamber both above and below the piston, it being understood that oil is free to bleed from the upper side of the piston to the lower side thereof even though the piston valves are closed.

From the foregoing it will have been noted that the floating displacement head provides for a variable capacity pressure chamber. Also it will have been seen that advantage is taken of the shock absorbing action produced by the displacement of oil by the entering piston rod on the impact stroke and that this shock absorbing action can be controlled and varied by suitably calibrating the strength of the spring 51 and thus different operating curve characteristics can be obtained from the shock absorber.

Another important feature which should be noted is that the space in the tube 10 above the floating displacement head provides an expansion chamber so that the seal afforded by the sealing gasket 20 need only be a low pressure seal to adequately prevent the escape of oil from the shock absorber around the piston rod 22. The shock absorber employs only a single tube and hence eliminates the usual concentric reservoir tube and the parts associated therewith, thus effecting a substantial saving in material. In addition, the use of a single tube enables the heat generated in the shock absorber to dissipate more readily since it goes directly from the tube 10 to atmosphere as contrasted in the usual shock absorber of passing through the oil in the concentric reservoir and then through the reservoir tube.

The present shock absorber contains no moving impact and recoil valves in the closure between the pressure chamber and the reservoir and which valves frequently in operation are noisy. Hence, a shock absorber embodying the present invention is quieter during its operation.

The shock absorber of the present invention is not unduly elongated even though the reservoir is in line or longitudinal extension with the pressure chamber and this is an important consideration in view of the limitations in the spaces wherein shock absorbers of this type must be mounted.

Although a preferred embodiment of the invention has been illustrated and described herein it will be understood that the invention is susceptible of various modifications and adaptations within the scope of the appended claims.

Having thus described my invention, I claim:

1. A direct double acting hydraulic shock absorber comprising a tube closed at its opposite ends and adapted to contain hydraulic medium, a reciprocable piston rod entering said tube through one end thereof, sealing means surrounding said rod at said one end, a piston on said rod within said tube, a floating displacement head slidable in said tube intermediate piston and said one end and through which said piston rod slidably extends, said head defining with the other end of the tube a variable capacity pressure chamber and with said one end of the tube a reservoir adapted to be partially filled with the hydraulic medium, said head having means substantially sealing against flow of medium from said chamber to said reservoir throughout the movement of said piston in one direction and providing for flow of the medium from said reservoir to said chamber at substantially the end of the piston movement in the opposite direction, spring means in said tube intermediate said one end and said head and exerting a predetermined spring load on the latter acting to move it longitudinally of the tube away from said one end wherefore when the pressure within the pressure chamber increases due to displacement of the hydraulic medium by the piston rod as it enters the pressure chamber and exceeds the predetermined spring load on said head the latter moves toward said one end of the tube and the capacity of the pressure chamber is increased.

2. A direct double acting hydraulic shock absorber as defined in claim 1 and wherein said means on said head for sealing against flow of medium from said chamber to said reservoir throughout the movement of said piston in one direction and for providing for flow of the medium from said reservoir to said chamber during substantially the end of the piston movement in the opposite direction includes passages through said head and an annular flexible member carried by said head within said pressure chamber and engaging said tube and acting to seal against flow of hydraulic medium through said passages in one direction.

3. A direct double acting hydraulic shock absorber as defined in claim 1 and wherein said tube and said displacement head are provided with cooperating means limiting the maximum movement of said head away from said one end of the tube under the action of said spring load.

4. A direct double acting hydraulic shock absorber as defined in claim 1 and wherein said floating displacement head comprises a cup-like portion slidable in said tube and a bottom portion through which said piston rod slides and provided with a plurality of radial passages communicating with the interior of the cup-like portion and the interior of the tube intermediate the tube and the circumference of the bottom portion, and a cup-shaped packing washer carried by the bottom portion below said radial passages and facing toward the other end of the tube and having its lip contacting said tube.

5. A direct double acting hydraulic shock absorber as defined in claim 4 and wherein said bottom portion of the displacement head is provided with air venting means communicating with the space between the cup-shaped packing washer and extending to one of said radial passages in said bottom portion of the head.

6. A direct double acting hydraulic shock absorber comprising a tube closed at its opposite ends and adapted to contain hydraulic medium, a reciprocable piston rod entering said tube through one end thereof, sealing means surrounding said rod at said one end, a piston on said rod within said tube and provided with valve means controlling the flow of hydraulic medium from one side of the piston to the other side thereof during the movements of the piston in the tube in opposite directions, a floating displacement head slidable in said tube intermediate the piston and said one end and through which said piston rod slidably extends, said head defining with the other end of the tube a variable capacity pressure chamber and with said one end of the tube defining a reservoir adapted to be partially filled with the hydraulic medium and an expansion chamber whereby said sealing means surrounding the piston rod can be a low pressure seal, said head having means substantially sealing against flow of medium from said chamber to said reservoir throughout the movement of said piston in one direction and providing for flow of the medium from said reservoir to said chamber at substantially the end of the piston movement in the opposite direction, spring means in said tube intermediate said one end and said head and exerting a predetermined load on the latter acting to move it longitudinally of the tube away from said one end, wherefore when the pressure in the pressure chamber created by the hydraulic medium displaced by the piston rod as it enters the pressure chamber exceeds the predetermined spring load on said head the latter moves toward said one end of the tube and the capacity of the pressure chamber is increased.

7. A direct double acting hydraulic shock absorber as defined in claim 6 and wherein said means on said head which substantially seals against flow of medium from said chamber to said reservoir throughout the movement of said piston in one direction and provides for flow of the medium from said reservoir to said chamber at substantially the end of the movement of the piston in the opposite direction includes passages through said head and a flexible annular member carried by said head within the pressure chamber and engaging said tube and sealing against flow of the pressure medium in one direction.

8. A direct double acting hydraulic shock absorber as defined in claim 6 and wherein said tube and said displacement head are provided with cooperating means limiting the maximum movement of said head away from said one end of the tube under the action of said spring load.

9. A direct double acting hydraulic shock absorber as defined in claim 6 and wherein said floating displacement head comprises a cup-like portion slidable in said tube and a bottom portion through which said piston rod slides and provided with a plurality of radial passages communicating with the interior of the cup-like portion and the interior of the tube intermediate the tube and the circumference of the bottom portion, and a cup-shaped packing washer carried by the bottom portion below said radial passages and facing toward the other end of the tube and having its lip contacting said tube.

10. A direct double acting hydraulic shock absober as defined in claim 9 and wherein said bottom portion of the displacement head is provided with air venting means communicating with the space between the cup-shaped packing washer and extending to one of said radial passages in said bottom portion of the head.

WILLIAM G. PATRIQUIN.

References Cited in the file of this patent

UNITED STATES PATENTS

| Number | Name | Date |
|---|---|---|
| 1,261,011 | Cook | Apr. 2, 1918 |
| 2,038,032 | Flynn | Apr. 21, 1936 |
| 2,342,381 | Thornhill | Feb. 22, 1944 |

FOREIGN PATENTS

| Number | Country | Date |
|---|---|---|
| 455,841 | Great Britain | Oct. 28, 1936 |
| 705,634 | Germany | May 25, 1941 |